(12) United States Patent
Merritt

(10) Patent No.: US 6,978,532 B1
(45) Date of Patent: Dec. 27, 2005

(54) MOWER BED BLADE METHOD

(75) Inventor: James R. Merritt, Winston Salem, NC (US)

(73) Assignee: JRM, Inc., Clemmons, NC (US)

( * ) Notice: Subject to any disclaimer, the term of this patent is extended or adjusted under 35 U.S.C. 154(b) by 0 days.

(21) Appl. No.: 10/703,888

(22) Filed: Nov. 7, 2003

(51) Int. Cl.⁷ ............................................ B23P 13/04
(52) U.S. Cl. ........................... 29/558; 29/417; 29/557; 72/294; 72/325; 72/330; 72/336; 72/339; 72/340; 56/289
(58) Field of Search .......................... 56/255, 289, 295; 29/417, 557, 558, 33 Q, 650; 72/294, 297, 72/306, 307, 324, 329, 330, 331, 335, 336, 72/339, 340, 341, 325, 338

(56) References Cited

U.S. PATENT DOCUMENTS

| | | | | |
|---|---|---|---|---|
| 2,952,895 A | * | 9/1960 | Ingersoll | 29/14 |
| 3,096,608 A | * | 7/1963 | Williamson | 56/295 |
| 3,712,037 A | * | 1/1973 | Knipe | 56/295 |
| 4,198,803 A | * | 4/1980 | Quick et al. | 56/296 |
| 4,628,672 A | * | 12/1986 | Jones | 56/295 |
| 5,077,961 A | * | 1/1992 | Schumacher et al. | 56/255 |
| 5,251,514 A | * | 10/1993 | Rhodarmer et al. | 76/104.1 |
| 5,899,052 A | * | 5/1999 | Turner | 56/255 |
| 5,906,053 A | * | 5/1999 | Turner et al. | 30/347 |
| 5,916,114 A | * | 6/1999 | Turner | 56/255 |
| 6,120,220 A | * | 9/2000 | Speare | 408/1 R |
| 6,422,052 B2 | * | 7/2002 | Park | 72/307 |
| 6,446,346 B1 | * | 9/2002 | Castleman | 30/276 |

OTHER PUBLICATIONS

Partial Printouts from: Foley United, provider of the Sharpening equipment and Dake-Division of JSJ Corporation, provider of the Hydraulic press; both utilized during the manufacturing process of the mower bed blade. (undated).

* cited by examiner

Primary Examiner—Essama Omgba

(57) ABSTRACT

A method of forming a durable mower bed blade is provided in which the grain of the metal is perpendicular to the longitudinal axis of the blade. The blade is formed in part by coining the blade on a hydraulic press which strengthens the cutting edge and other areas to prevent chipping and cracking. Additional steps in the process include shearing the blade to a proper width, heat treating and grinding the edge of the blade to sharpen it.

18 Claims, 6 Drawing Sheets

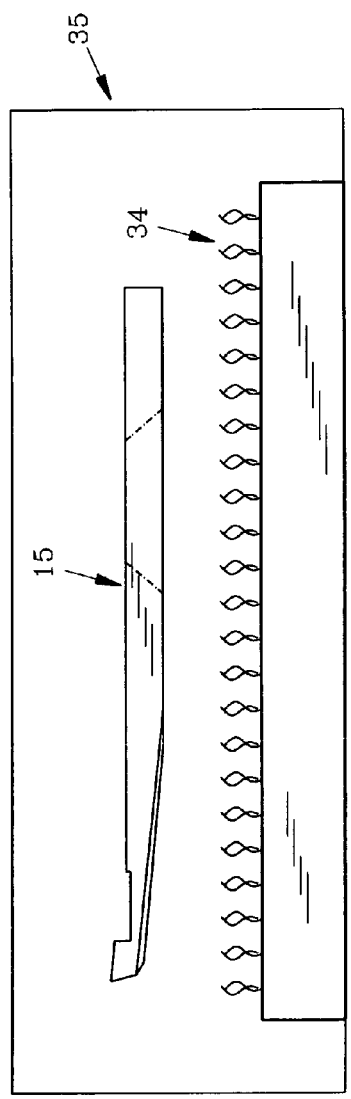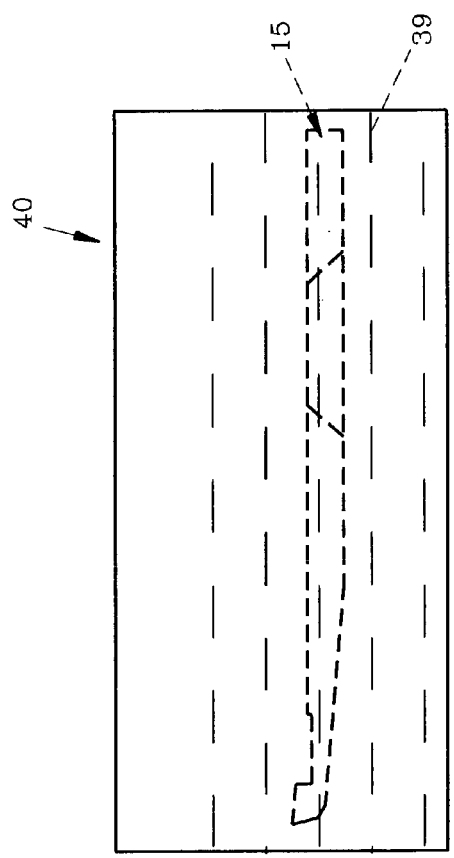
FIG. 5
FIG. 4

MOWER BED BLADE METHOD

FIELD OF THE INVENTION

The invention herein pertains to a method for forming a blade for a grass mower and particularly pertains to forming a bed blade for a mower as used for cutting golf greens.

DESCRIPTION OF THE PRIOR ART AND OBJECTIVES OF THE INVENTION

Grass mowers of the reel type conventionally use a lower or "bed" blade which in combination with the reel blades cuts grass to a high or exact tolerance. Golf greens which are cut once or more daily require very sharp blades and it is not unusual for a greens keeper to cut only two or three greens before having to remove the blades from the mower and sharpen them to ensure a smooth, close, even cut for the next green. Removing, sharpening and replacing the mower blades requires much time, energy and expense. In critical mowing times as during golf tournaments, the time and energy spent can be very costly and exacting.

Conventional bed blades are generally formed by stamping metal blanks and sharpening the blanks to form a cutting edge with the grain of the metal parallel to the longitudinal axis of the blade. While this provides convenience in manufacturing and sharpening, valuable blade strength is sacrificed. Such blades often crack or chip along the lateral edges and must be replaced. Conventional blades are also likely to crack or distort when impacted by a rock along the cutting edge.

During manufacturing, milling or machining with a conventional CNC machine at one location on the blade may take 4–5 minutes, which greatly adds to the blade cost. Further, many conventional mower bed blades are made by stamping, however dies are not used and the stamped blanks are not uniform and can slightly vary in shape and size. This nonuniformity requires additional manufacturing steps which adds to the blade cost and expense.

In view of conventional mower bed blade qualities, techniques and processes for manufacturing, the present invention was conceived and one of its objectives is to provide a method for manufacturing mower bed blades which insures uniform results from blade to blade.

It is another objective of the present invention to provide a method for manufacturing a mower bed blade in which the blade is stronger, less likely to crack or chip and is more durable than conventional bed blades.

It is a further objective of the present invention to provide a method for manufacturing a mower bed blade in which the blade is coined during the manufacturing process.

It is still another objective of the present invention to provide a method for manufacturing a mower bed blade which is quick, efficient and relatively inexpensive.

It is yet another objective of the present invention to provide a method for manufacturing a mower bed blade which saves time and manufacturing expense.

It is another objective of the present invention to provide a method for manufacturing a mower bed blade edge which includes a coining step which greatly reduces the manufacturing time over conventional CNC machine techniques.

Various other objectives and advantages of the present invention will become apparent to those skilled in the art as a more detailed description is set forth below.

SUMMARY OF THE INVENTION

The aforesaid and other objectives are realized by utilizing a manufacturing process for mower bed blades, and particularly for mower bed blades as used on mowers for golf greens. The first step in the manufacturing process includes selecting a suitable coil of flat steel with the grain running the length of the coiled steel. The coil is sized having a width slightly larger than the width of the desired finished blade. The leading end of the coil is first directed to a stamping press of suitable tonnage. The press stamps the metal coil into blade blanks with the length of the blanks parallel to the grain of the metal. (Length as used herein for the blank and the blade is shorter than the width). At the same time mounting holes are punched into the blanks.

The second and most important step of the manufacturing process consists of coining the blank with a high tonnage hydraulic press by placing the punched blank into a fixture on the press having mounting studs which accommodate the previously punched holes in the blank. A coining die is then pressed from above onto the fixed blank under high tonnage. The coining forces the blade material to conform to the die to thereby form the cutting edge of the blade. This coining step also changes the shape of the blank and provides required strength and durability to the blade directly behind the cutting edge. Next, the blade is sheared in the press to remove any excess metal from the ends of the blade resulting from the coining step and reduces the amount of grinding that is later required.

After coining, the blade is then machined, first to countersink each punched mounting hole, such as with a standard CNC milling machine. Next, the blade is machined to form clearance angles along the blade. In this step two (2) blades are placed end-to-end with the coined area facing upwardly. The blades are then clamped and machined to provide the desired clearance angles.

The blades are then checked for uniformity and are then transferred to another CNC machine. Usually, four (4) blades at a time are machined by placing the coined side upwardly and the blades are machined at selected locations to a fifteen degree (15°) angle to remove excess metal and provide useful clearance. Excess metal is also removed so as to reduce the time spent in the final blade grinding.

The blades are then conventionally heat treated after machining. For this step a blade is placed in a fixture which will maintain the blade in a flat posture. The blade is then heated to a desired temperature in a conventional salt pot at a high temperature of about one thousand five hundred and seventy-five degrees Fahrenheit (1575° F.). Next, the blade is tempered at a lower temperature about five hundred twenty-five degrees Fahrenheit (525° F.), also in salt, and is then tempered with hot air at about seven hundred degrees Fahrenheit (700° F.). This treatment provides a Rockwell Hardness of about 48–50 for the blade.

The final manufacturing step is accomplished using two (2) grinders to sharpen the cutting edge. Each grinder is set to a certain preselected angle and each mower bed blade is secured in a fixture. The first grinder is set to a five degree (5°) angle and the second grinder is set to a fifteen degree (15°) angle. By using two (2) grinders at different angles, the grinders can operate simultaneously. This is proven to take less time than changing the angle on only one grinder or moving the blade from one fixture to another. After grinding the blade can be packaged for shipment.

The blades produced in this manner are uniform, extremely durable and require infrequent sharpening. Such blades also seldom chip or crack as often happens with conventional bed blades.

BRIEF DESCRIPTION OF THE DRAWINGS

FIG. 4 schematically pictures the bed blade being heat treated in a standard salt pot;

FIG. 5 features the bed blade as seen in FIG. 4 as heated with air;

DETAILED DESCRIPTION OF THE PREFERRED EMBODIMENT AND OPERATION OF THE INVENTION

Figure 1:
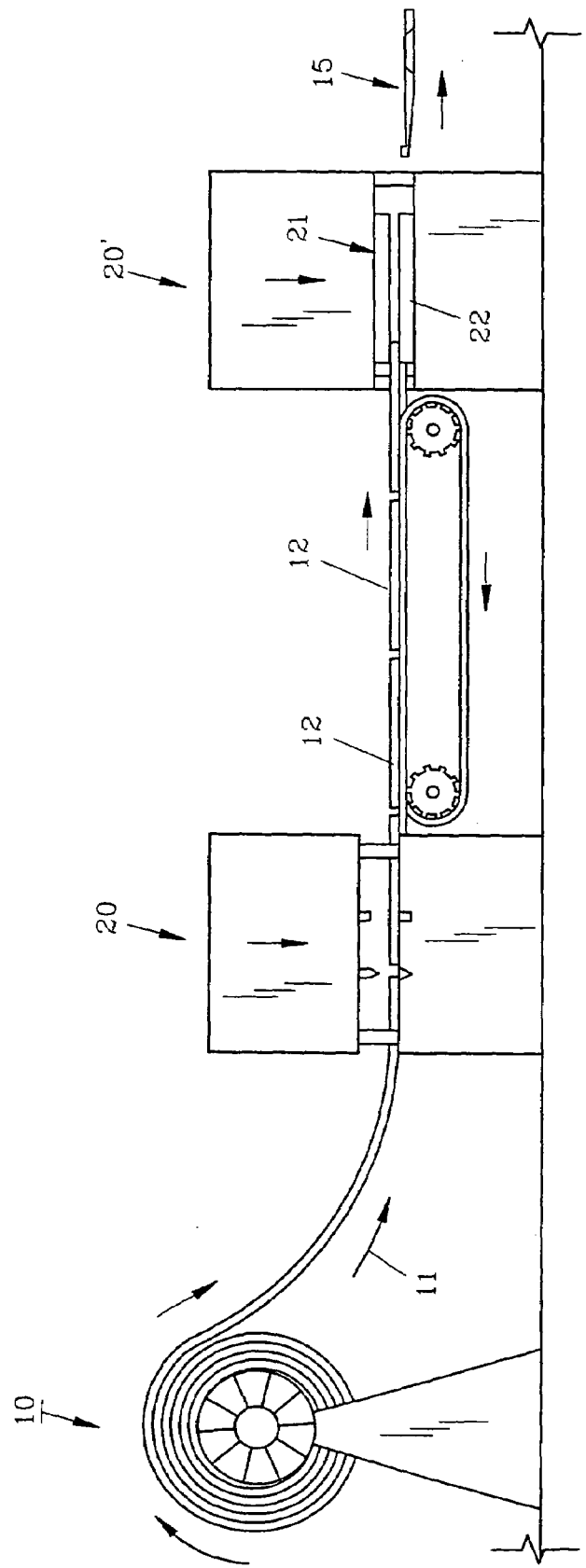
FIG. 1 demonstrates a partial schematic manufacturing line for the bed blades of the invention.
Figure 2:
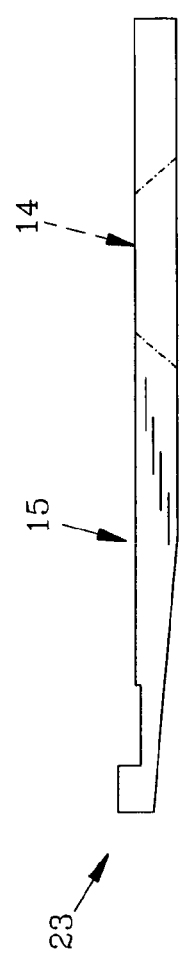
FIG. 2 shows an enlarged right side view of a bed blade as manufactured by the method described herein before machining, the left side view being a mirror image thereof.
Figure 7:
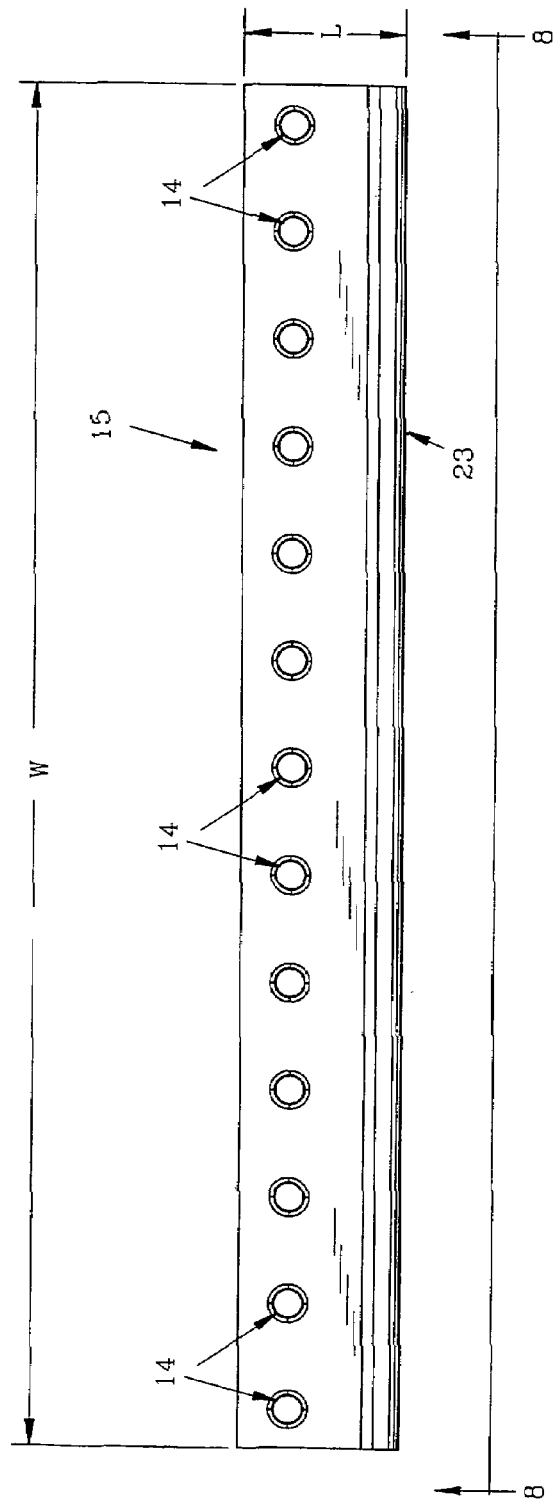
FIG. 7 depicts a top view of the finished bed blade ready for mounting on a mower bed bar.
Figure 8:
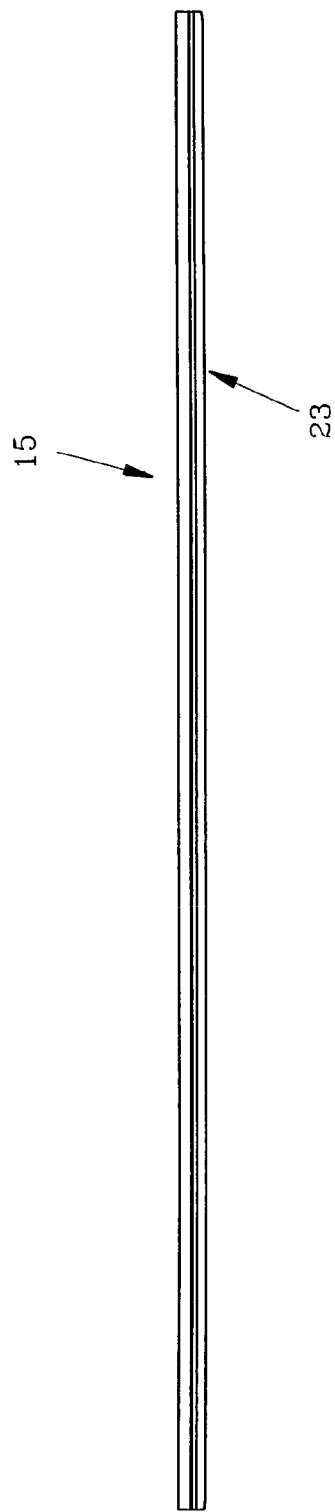
FIG. 8 demonstrates a front view of the finished blade showing the cutting edge as seen along lines 8—8 of FIG. 7.
Figure 9:
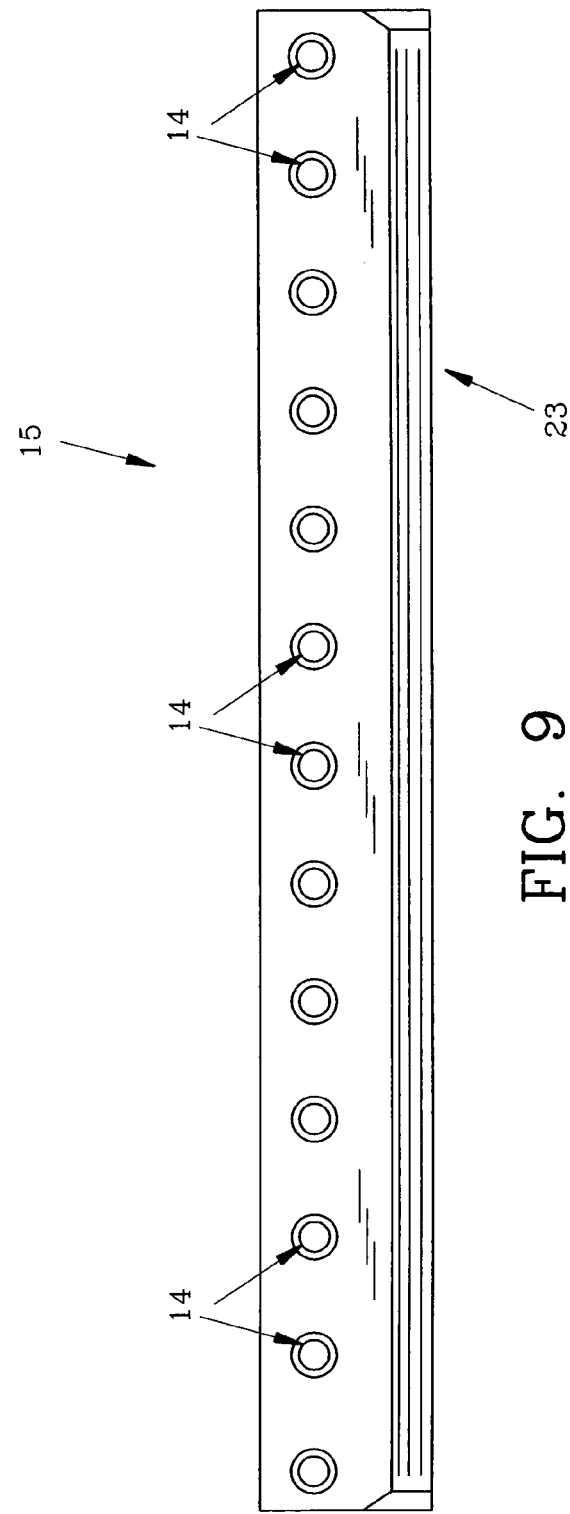
FIG. 9 pictures a bottom view of the bed blade as seen in FIG. 7.
Figure 10:
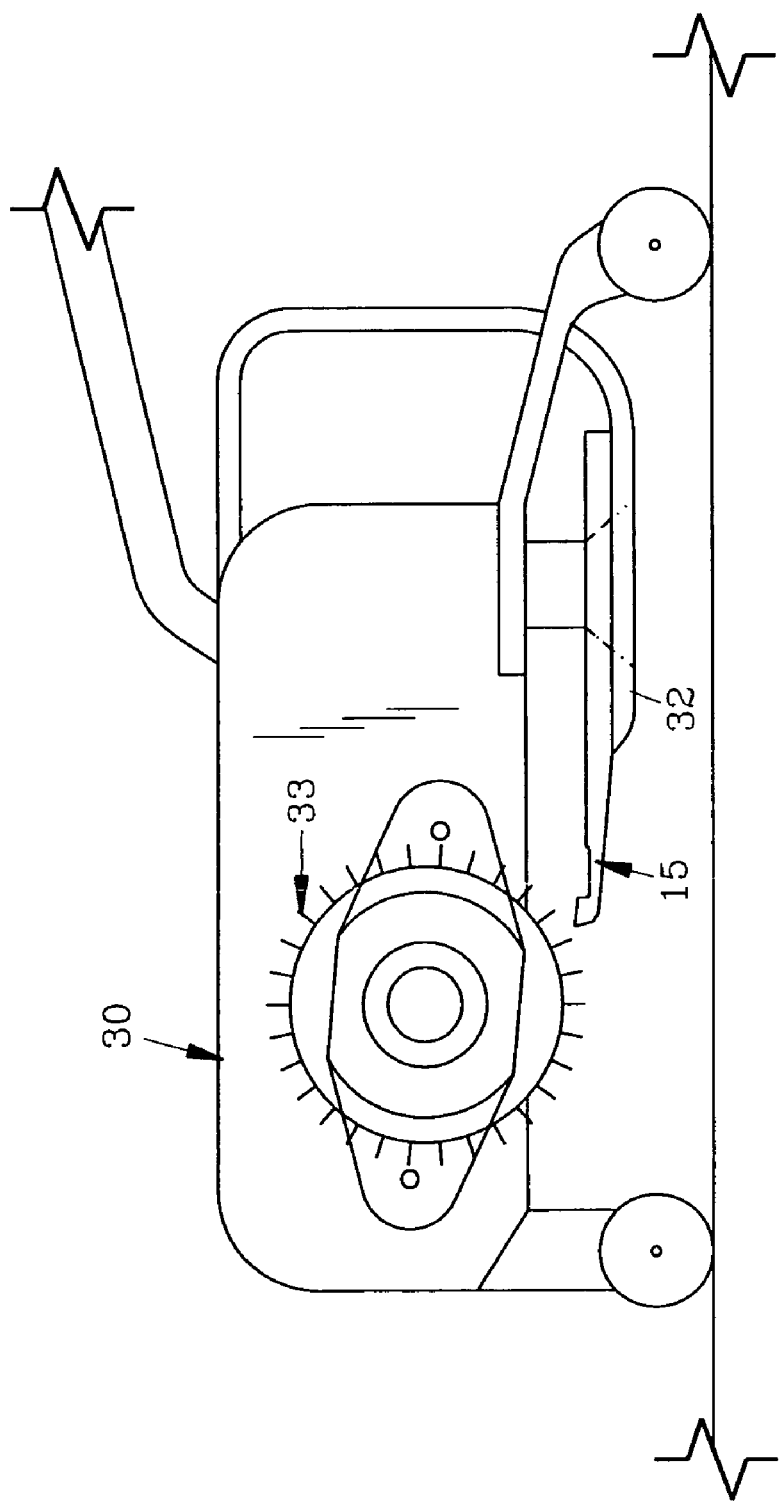
FIG. 10 illustrates the bed blade as mounted on the bed bar of a mower (seen schematically).

For a better understanding of the invention and its operation, turning now to the drawings, FIG. 1 shows in schematic representation certain steps of the preferred process for manufacturing mower bed blades. Coil 10 of preferably, grade 1566 (AISI-SAE1566) flat steel (UNS No. 615,660) having a carbon (c) content of; 0.60–0.71%; manganese (mn) 0.85–1.15%; phosphorous (p) 0.040% and sulfur (s) 0.050% is utilized. While other steels can be used, this particular alloy is preferred. Steel coil 10 has a width of 21.75 inches (552.45 mm) and a thickness of 0.134 inches (3.3 mm) with the grain running in the direction of the length of the coil as indicated by arrow 11. Dake hydraulic press 20 as manufactured by Dake, division of JSJ Corporation of 724 Robbins Road, Grand Haven, Mich. 49417, having a capacity of 400 tons, shears the leading edge of coil 10 into blade blanks 12 measuring 2.5 inches (63.5 mm) long (not shown to scale in FIG. 1). Press 20 cuts coil 10 into blanks 12 using a shearing force of about 200 tons. Simultaneously with the shearing of metal coil 10, mounting holes 14 are punched into blank 12 as shown in FIG. 2. Thirteen (13) mounting holes 14 are preferably punched into each blank 12 as seen in FIG. 7 although more or less mounting holes can be utilized depending on the particular mower bed bar to be accommodated, such as bed bar 32 seen in FIG. 10 of mower 30 (shown in schematic representation).

In the next step of the preferred manufacturing method, also seen in FIG. 1, blanks 12 are conveyed or delivered to a second Dake press 20'. Blanks 12 are then coined by a force of approximately 400 tons. In this step die 21 is urged downwardly onto blank 12 positioned within fixture 22. This coining step forms the rough cutting edge 23 on blank 12 as seen in FIG. 2 and by using die 21, all coined blanks are consistent and uniform. This coining process takes much less time than machining with a CNC machine (5 seconds vs. 2–3 minutes per blank) to form cutting edge 23. During the coining step edge 23 of blade 15 is exactly formed (FIG. 2) and any extra metal is forced to the outside edges of the coined area. As the grain of the metal is parallel to the short dimension (63.5 mm) or length of the blank, this renders blade 15 much stronger and durable than conventional machine formed bed blades. Length "L" and width "W" of blade 15 are shown in FIG. 7.

Blade 15 formed in the coining process is then sheared to a finished dimension. This likewise occurs in a Dake 400 ton press such as press 20' as seen in FIG. 1. Blade 15 is first clamped in position with the coined area facing upwardly and the ends of the blade are then sheared to a final dimension of 21.25 inches (539.75 mm) in width. Shearing is a quick step and reduces the time required for subsequent machining. FIG. 2 illustrates the side of blade 15 (shown enlarged) as it exits press 20' after shearing.

The next step in the manufacturing method is to countersink each hole 14 (FIG. 2) in blade 15. Holes 14 are countersunk with a standard CNC machine (not shown) to a desired depth as is conventional in the trade. After holes 14 are countersunk, blade 15 is machined also on the same CNC machine (not seen) to provide clearance angles thereon. As shown enlarged in FIG. 3, four (4) clearance angles at areas A, B, C and D are machined. Using only one cutter, two (2) blades 15 are placed end-to-end with the coined side down and forward. One blade is secured at five (5°) degrees, the other at negative five degrees (5°) and a third blade is secured behind the first two (2) blades and all are fixed in place on the CNC machine. Thus, three (3) blades are machined along areas A and B using only one cutter of the CNC machine.

Figure 3:
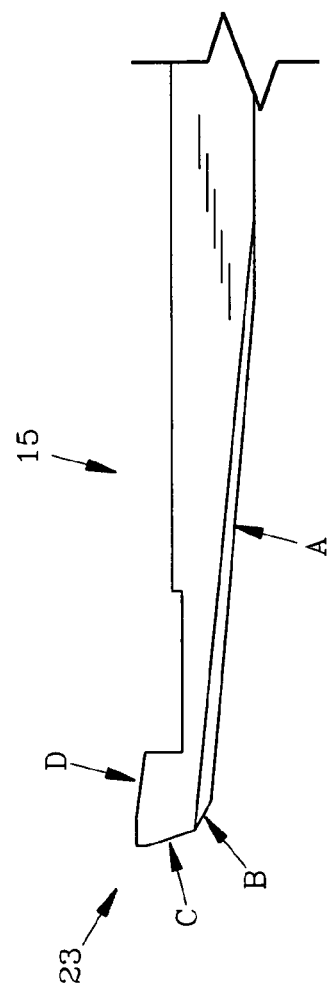
FIG. 3 illustrates a partial bed blade as seen in FIG. 2 with clearance angles machined thereon.
Figure 6:
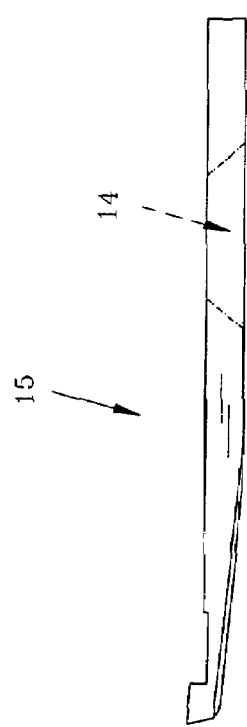
FIG. 6 shows a side view of the bed blade as seen in FIG. 5 after final grinding.

After areas A and B have thus been machined, blades 15 are quality checked and moved to a second CNC milling machine (not shown). Here four (4) blades 15 are machine simultaneously. The coined area again is faced downwardly as blades 15 are mounted and fixed face to face on the second CNC machine. The angle at area A as shown in FIG. 3 is increased to fifteen degrees (15°). Thereafter, blades 15 are inverted, mounted again in the same fixture and areas C and D are machined to a five degree (5°) angle to remove any excess metal and therefore reducing final grinding time.

After machining, blades 15 are heat treated by raising the temperature of blade 15 in salt solution 39 as seen schematically in FIG. 4 to a temperature of approximately one thousand five hundred and seventy-five degrees Fahrenheit (1575° F.) in salt pot 40 as is used in the trade for about five (5) minutes. Next, the blade is tempered (austemper) at about five hundred twenty-five degrees Fahrenheit (525° F.) for thirty (30) minutes in similar salt pot 40. Next, blade 15 is heated to seven hundred degrees Fahrenheit (700° F.) by hot air 34 (seen schematically at 35 in FIG. 5), for five (5) hours and is then cooled with ambient air. Before heating blades 15 are placed in a fixture to render them flat. This heat treatment and tempering provides blade 15 with a Rockwell hardness of approximately 48–50.

Finally, cutting edge 23 of blade 15 is ground to a sharp point along areas C and D as seen in FIG. 3. Using two (2) bed knife grinders as sold by Neary Technologies Division, Foley United of River Falls, Wis. Once blade 15 is ground as seen in the various views of FIGS. 6, 7, 8 and 9 it can then be mounted on bed bar 30 of standard mower 32 shown schematically in FIG. 10 having cutting reel 33.

The illustrations and examples provided herein are for explanatory purposes and are not intended to limit the scope of the appended claims.

I claim:

1. A method of forming a bed blade for a mower from a thin metal with the grain running the length of the metal comprising the steps of:
   a) forming a metal blank with the grain running the length of the blank;
   b) punching mounting holes in the metal blank;
   c) coining the blank with mounting holes to form a blade with a cutting edge which extends perpendicular to the grain direction along the width of the blade;
   d) heat treating the blade; and
   e) grinding the blade to sharpen the cutting edge.

2. The method of claim 1 wherein forming a metal blank comprises the step of shearing the blank from a coil of metal.

3. The method of claim 1 wherein coining the blank comprises the step of coining the blank with press studs penetrating the mounting holes of the blank.

4. The method of claim 3 wherein coining the blank comprises the step of placing the blank into a die and stamping the blank to conform the blank to at least the size of the die while forming a cutting edge on the blank.

5. The method of claim 4 further comprising the step of shearing the blade to a precise length.

6. The method of claim 1 further comprising the step of machining the mounting holes.

7. The method of claim 6 further comprising the step of machining the blade to bias edges for clearance.

8. The method of claim 1 wherein grinding the blade comprises the step of placing the blade in a fixture in a first grinder.

9. The method of claim 8 further comprising the step of placing the blade and fixture in a second grinder to sharpen the cutting edge.

10. The method of claim 1 wherein heat treating the blade comprises the steps of:
    (a) placing the blade in a flattening fixture to stabilize the blade;
    (b) raising the temperature of the blade to a desired temperature; and
    (c) thereafter quenching the heated blade in a liquid salt solution.

11. The method of claim 10 further comprising the step of forming the blade having a 48–50 Rockwell hardness.

12. A method of forming a bed blade for a mower comprising the steps of:
    a) forming a metal blank having a length shorter than the width, with the grain of the metal running the length of the blank;
    b) punching mounting holes in the metal blank;
    c) placing the blank in a fixture on a press having mounting studs to accommodate the mounting holes;
    d) coining the blank within the fixture to form a blade with a cutting edge along the width of the blade;
    e) shearing the blade while in the fixture to an exact length;
    f) machining the blade; and
    g) heat treating the blade.

13. The method of claim 12 wherein machining the blade comprises the step of countersinking the mounting holes.

14. The method of claim 12 wherein machining the blade comprises the step of machining clearance angles on the blade.

15. The method of claim 14 wherein machining clearance angles on the blade comprises the step of:
    machining two blades simultaneously.

16. The method of claim 12 wherein machining the blade includes the step of grinding the cutting edge to sharpen the same.

17. The method of claim 12 wherein heat treating the blade comprises the step of placing the blade in a flattening fixture, and thereafter heating the blade to 1575° F. in a first salt pot to harden the blade to an approximate 48–50 Rockwell hardness.

18. The method of claim 17 wherein heat treating the blade comprises the steps of hardening the blade by:
    a) placing the blade in a second salt pot having a temperature lower than said first salt pot;
    b) heating the blade to a temperature greater than the temperature of said second salt pot; and
    c) thereafter cooling the blade.

* * * * *